(12) United States Patent
Li et al.

(10) Patent No.: US 11,789,175 B2
(45) Date of Patent: Oct. 17, 2023

(54) MULTI-ENERGY STATIC SECURITY CT SYSTEM AND IMAGING METHOD

(71) Applicants: Baolei Li, Beijing (CN); Yantao Hu, Beijing (CN); Yunxiang Li, Beijing (CN); Zhili Cui, Beijing (CN); Jian Gao, Beijing (CN); Jie Luo, Beijing (CN)

(72) Inventors: Baolei Li, Beijing (CN); Yantao Hu, Beijing (CN); Yunxiang Li, Beijing (CN); Zhili Cui, Beijing (CN); Jian Gao, Beijing (CN); Jie Luo, Beijing (CN)

(73) Assignee: NANOVISION TECHNOLOGY (BEIJING) CO., LTD, Beijing (CN)

( * ) Notice: Subject to any disclaimer, the term of this patent is extended or adjusted under 35 U.S.C. 154(b) by 244 days.

(21) Appl. No.: 17/302,320

(22) Filed: Apr. 30, 2021

(65) Prior Publication Data

US 2021/0325563 A1  Oct. 21, 2021

Related U.S. Application Data

(63) Continuation of application No. PCT/CN2019/077239, filed on Mar. 6, 2019.

(30) Foreign Application Priority Data

Oct. 31, 2018 (CN) .......................... 201811287240.9
Oct. 31, 2018 (CN) .......................... 201821783336.X (51) Int. Cl.
*G01V 5/00* (2006.01)

(52) U.S. Cl.
CPC .................................... *G01V 5/005* (2013.01)

(58) Field of Classification Search
CPC ...... G01N 23/046; A61B 6/032; A61B 6/035; A61B 6/482; G01V 5/005; G01V 5/0041
See application file for complete search history.

(56) References Cited

U.S. PATENT DOCUMENTS

2009/0003514 A1*  1/2009  Edic ..................... G01V 5/0041
                                                                   378/10

* cited by examiner

*Primary Examiner* — Courtney D Thomas
(74) *Attorney, Agent, or Firm* — George Guosheng Wang; Upstream Research and Patent LLC (57) ABSTRACT

A multi-energy static security CT system comprises at least one N-stage image chain structure (5) and a baggage conveying belt (4) provided at an inner side at the bottom of the N-stage image chain structure (5). The N-stage image chain structure (5) and the baggage conveying belt (4) are fixed at a pre-configured positions by means of a machine frame (8). The N-stage image chain structures (5) are sequentially arranged in a forward direction of a baggage channel, and adjacent N-stage image chain structures (5) are offset relative to each other. By exposing radiation sources in the N-stage image chain structure (5) at different times, the static security CT system generates an image having a higher temporal resolution and more energy spectrum levels than an image generated by a spiral CT system. Also provided is an imaging method implemented by means of the static security CT system.

8 Claims, 8 Drawing Sheets

S1: Enable luggage or parcels to enter the luggage passage, control the focuses in the multi-focus X-ray sources of each of the single-stage image chain units to be exposed sequentially according to a preset time sequence, and collect projection data generated when the luggage or parcels pass through each of the single-stage image chain units through the corresponding detector assembly.

S2: When the luggage or parcels reach the last single-stage image chain unit of each group of the N-stage image chain structures, sequentially reconstruct and recognize each cross-sectional image from a first cross-sectional image of the luggage or parcels.

FIG. 8

MULTI-ENERGY STATIC SECURITY CT SYSTEM AND IMAGING METHOD

BACKGROUND

Technical Field

The present invention relates to a multi-energy static security CT system (hereinafter referred to as a static security CT system), also relates to an imaging method used by the static security CT system, and belongs to the technical field of radiation imaging.

Related Art

Existing security CT systems can be divided into two types, one is a spiral CT system based on a slip ring technology, and the other is a static CT system. In the spiral CT system, ray sources and detectors need to rotate around a to-be-checked object, and each component needs to bear huge centrifugal force in the rotation process, which puts forward high requirements for the design of key components, and has high implementation cost and technical difficulty. There is no slip ring in the static CT system, ray sources and detectors do not have to rotate relative to the to-be-checked object, which has the characteristics of high inspection speed, low maintenance cost, high reliability and the like and has been highly valued in recent years. However, the existing static CT system still has some shortcomings in aspects of imaging accuracy, imaging speed and the like, and it is difficult to fully meet the requirements of a security inspection site.

SUMMARY

The primary technical problem to be solved by the present invention is to provide a multi-energy static security CT system.

Another technical problem to be solved by the present invention is to provide an imaging method used by the multi-energy static security CT system.

In order to achieve the objective, the present invention adopts the following technical solutions.

According to a first aspect of an embodiment of the present invention, a multi-energy static security CT system is provided. The multi-energy static security CT system includes at least one group of N-stage image chain structures. An inner side of bottoms of the N-stage image chain structures is provided with a baggage conveying belt, and the N-stage image chain structures and the baggage conveying belt are fixed at preset positions through a rack, wherein N is a positive integer.

All groups of the N-stage image chain structures are sequentially arranged in an advancing direction of a baggage passage, and adjacent groups of the N-stage image chain structures are arranged in a staggered manner.

Preferably, each group of the N-stage image chain structures is composed of N single-stage image chain units.

All the single-stage image chain units in each group of the N-stage image chain structures are sequentially arranged in the advancing direction of the baggage passage, and adjacent single-stage image chain units are arranged in a staggered manner.

Preferably, each of the single-stage image chain units includes a multi-focus X-ray source and a detector assembly; among a plurality of focuses formed by the multi-focus X-ray source, adjacent focuses are arranged in a manner of any one of equidistant straight line arrangement, equiangular circular arc arrangement and equiangular curve arrangement.

Preferably, for the same single-stage image chain unit, among the plurality of focuses formed by the multi-focus X-ray source, included angles formed between connecting lines from two focuses located on the outermost side to a virtual rotation center and a connecting line from a focus located in the middle to the virtual rotation center are not larger than 5 degrees respectively, and an included angle formed by connecting lines from the two focuses located on the outermost side to the virtual rotation center is not larger than 10 degrees.

Preferably, among the plurality of focuses formed by the multi-focus X-ray source, an opening fan angle of a ray beam corresponding to each of the focuses covers an edge of the baggage passage, and moreover, an equivalent rotation angle formed by the multi-focus X-ray source and the detector assembly of each of the single-stage image chain units is not smaller than 180 degrees+max ($\theta 1, \theta 2, \theta 3, \ldots, \theta M$), wherein the max ($\theta 1, \theta 2, \theta 3, \ldots, \theta M$) is the maximum fan angle selected from the opening fan angles of ray beams corresponding to the plurality of focuses formed by the multi-focus X-ray source.

Preferably, a grid-control switch for controlling emitting/emitting stop of a ray tube or a ray source of each of the single-stage image chain units is disposed in the multi-energy static security CT system.

Preferably, the detector assembly includes a circular arc detector support and a plurality of detectors. The plurality of detectors are arranged on the circular arc detector support taking the center of the baggage passage as the center of a circle, and the plurality of detectors are right opposite to the middle position of the plurality of focuses of the multi-focus X-ray source.

Preferably, the detectors are any one or a combination of more of single-energy detectors, dual-energy interlayer detectors and photon counting detectors.

Preferably, when the detectors are single-row detectors, the single-row detectors and the focuses of the multi-focus X-ray source share an XY plane, and the single-row detectors are right opposite to the middle position of the plurality of focuses of the multi-focus X-ray source.

When the detectors are multi-row detectors, the middle-row detectors in the multi-row detectors and the plurality of focuses of the multi-focus X-ray source share an XY plane, and the multi-row detectors are right opposite to the middle position of the plurality of focuses of the multi-focus X-ray source.

According to a second aspect of the embodiment of the present invention, an imaging method is provided. The method is implemented by the multi-energy static security CT system and includes the following steps:

enabling baggage or parcels to enter a baggage passage, controlling focuses of a multi-focus X-ray source of each of single-stage image chain units to be exposed sequentially according to a preset time sequence, and collecting projection data generated when the baggage or parcels pass through each of the single-stage image chain units through a corresponding detector assembly; and when the baggage or parcels reach the last single-stage image chain unit of each group of N-stage image chain structures, sequentially reconstructing and recognizing each cross-sectional image from a first cross-sectional image of the baggage or parcels.

According to the static security CT system provided by the present invention, the plurality of single-stage image chain units composed of the multi-focus X-ray sources and the detector assemblies are used to form the N-stage image chain structures. Through exposure of different sequential ray sources in the N-stage image chain structures, images with higher time resolution and more energy levels than a spiral CT system can be generated, and the recognition rate of prohibited goods and the baggage inspection speed are improved. On the other hand, the static security CT system gets rid of the dependence on a slip ring, the multi-focus X-ray sources and the detectors do not need to rotate, and non-rotation static imaging is realized, so that the maintenance cost is reduced, and the equipment stability is improved.

DETAILED DESCRIPTION

Technical contents of the present invention are further described in detail below with reference to the accompanying drawings and specific embodiments.

Figure 1:
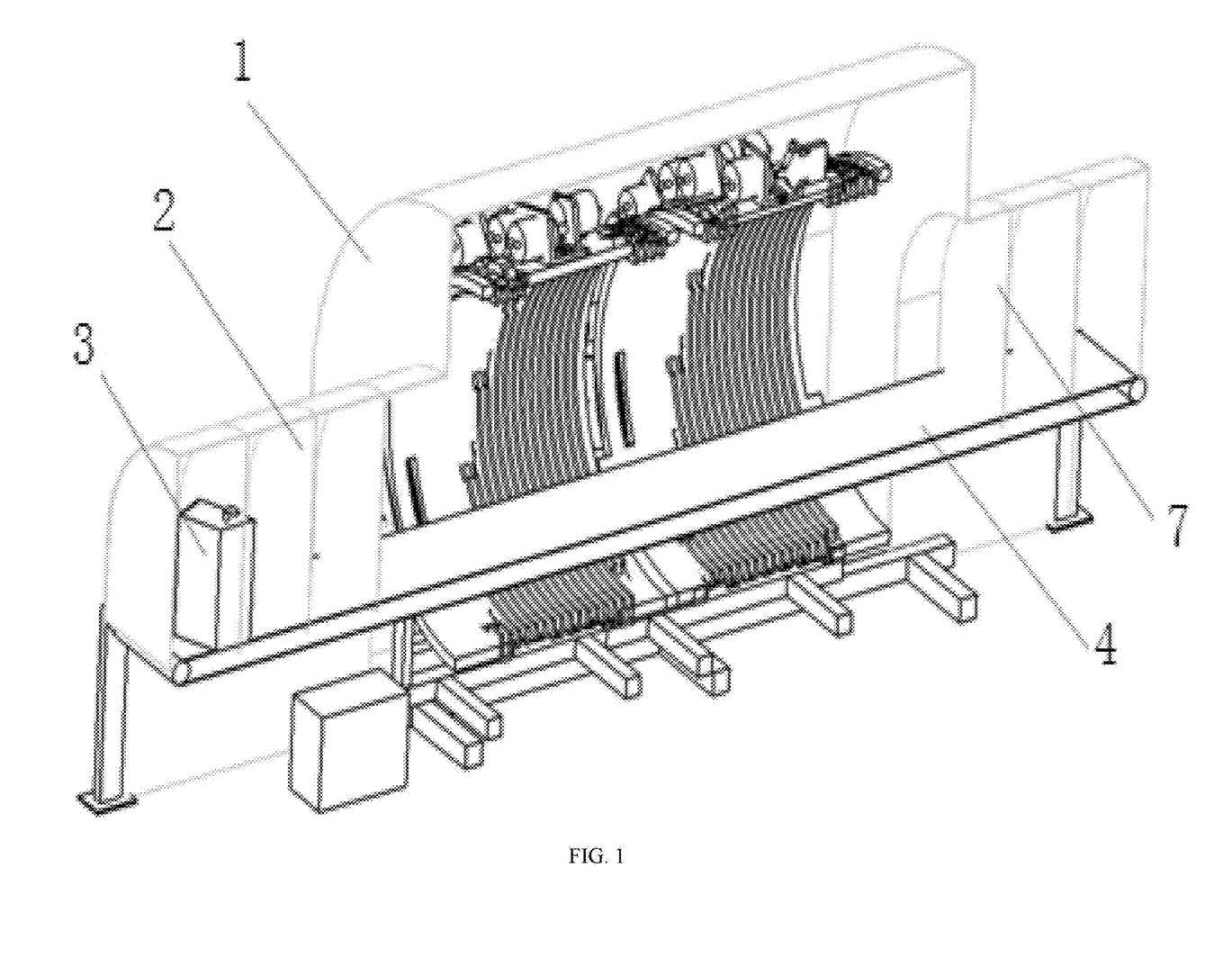
FIG. 1 is a cross-sectional view of a static security CT system provided by the present invention.
Figure 2:
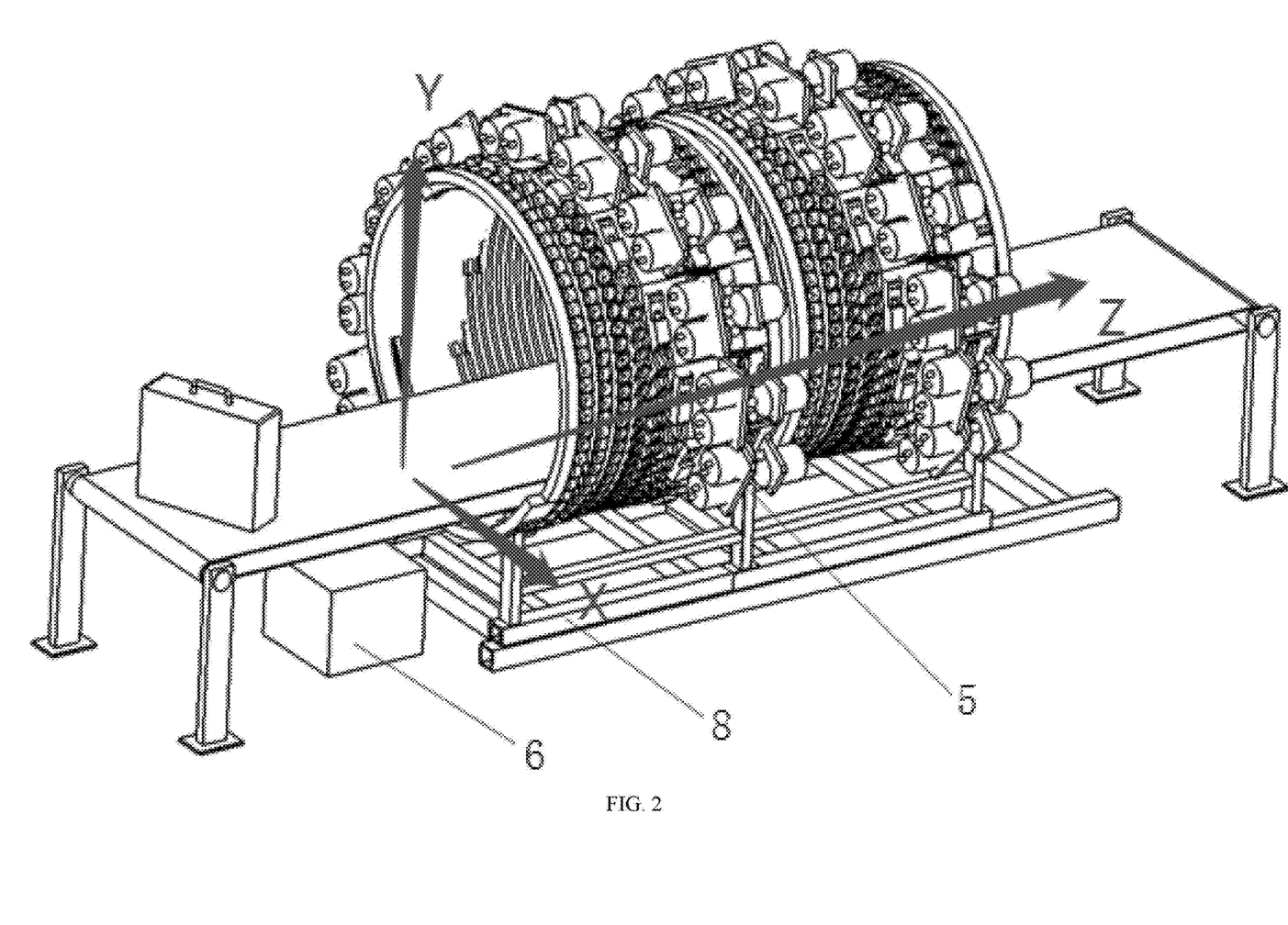
FIG. 2 is an internal structure diagram of the static security CT system provided by the present invention.

As shown in FIG. 1 and FIG. 2, the static security CT system provided by the present invention includes a shell 1, a goods inlet shielding curtain 2 and a goods outlet shielding curtain 7 that are sequentially connected. At least one group of N-stage image chain structures 5 is disposed in the shell 1. A baggage conveying belt 4 is disposed on an inner side of bottoms of the N-stage image chain structure 5. The N-stage image chain structures 5 and the baggage conveying belt 4 are fixed to preset positions of the static security CT system through a machine frame 8. Therefore, the baggage conveying belt 4 conveys checked baggage (or luggage, hereinafter) or parcels 3 to the N-stage image chain structures 5. Collection of projection data is completed through the N-stage image chain structures 5. The collected projection data is transmitted to a computer to generate a three-dimensional cross-sectional image of the checked baggage or parcels 3.

Figure 3:
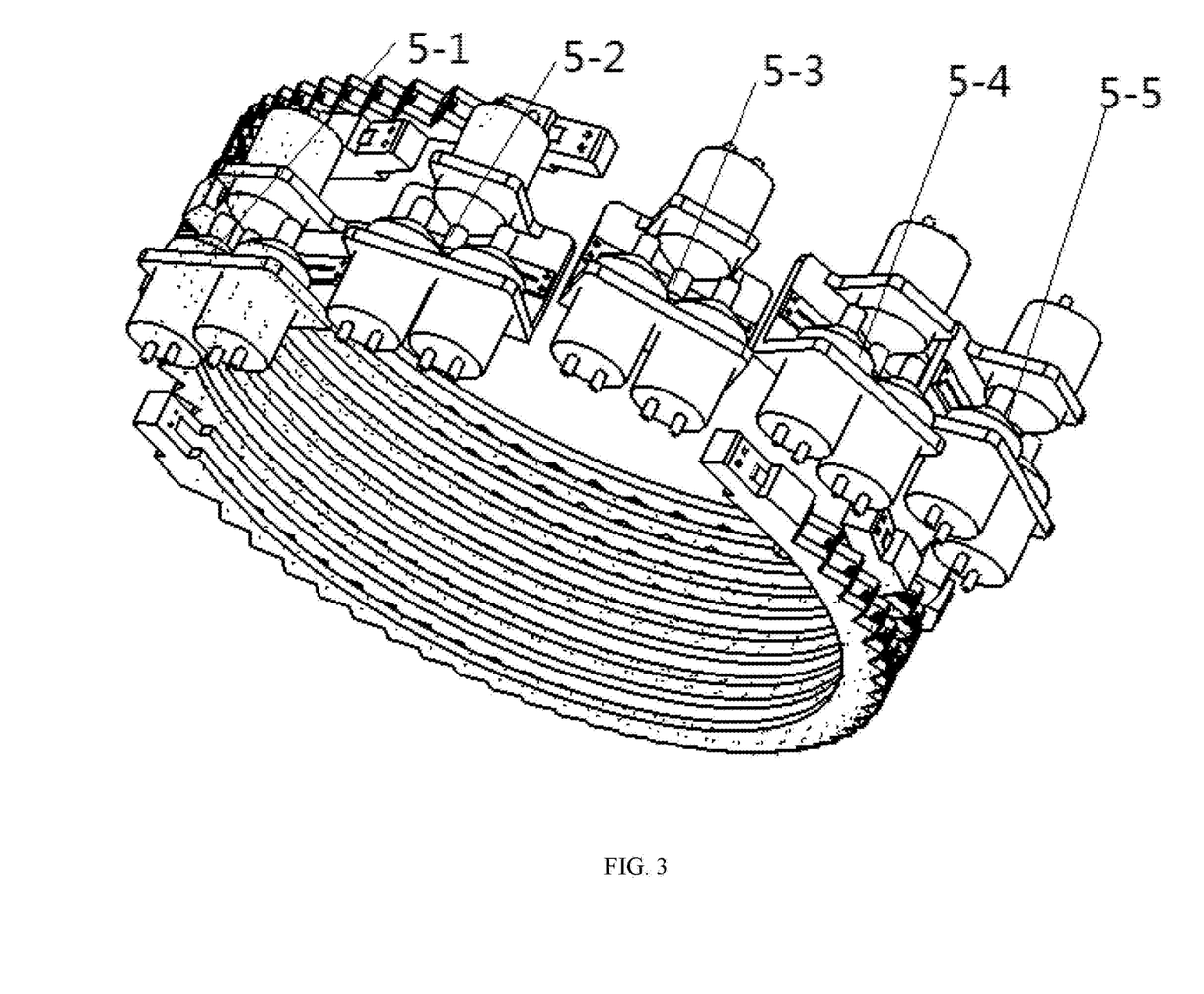
FIG. 3 is a structural diagram of an N-stage image chain structure in the static security CT system provided by the present invention.

Each group of the N-stage image chain structures 5 is composed of N single-stage image chain units. N is a positive integer and preferably ranges from 10 to 30. For example, assuming that each group of the N-stage image chain structures 5 is a five-stage image chain structure composed of five single-stage image chain units in the static security CT system, as shown in FIG. 3, the five-stage image chain structure includes a single-stage image chain unit 5-1, a single-stage image chain unit 5-2, a single-stage image chain unit 5-3, a single-stage image chain unit 5-4 and a single-stage image chain unit 5-5 respectively.

Figure 4:
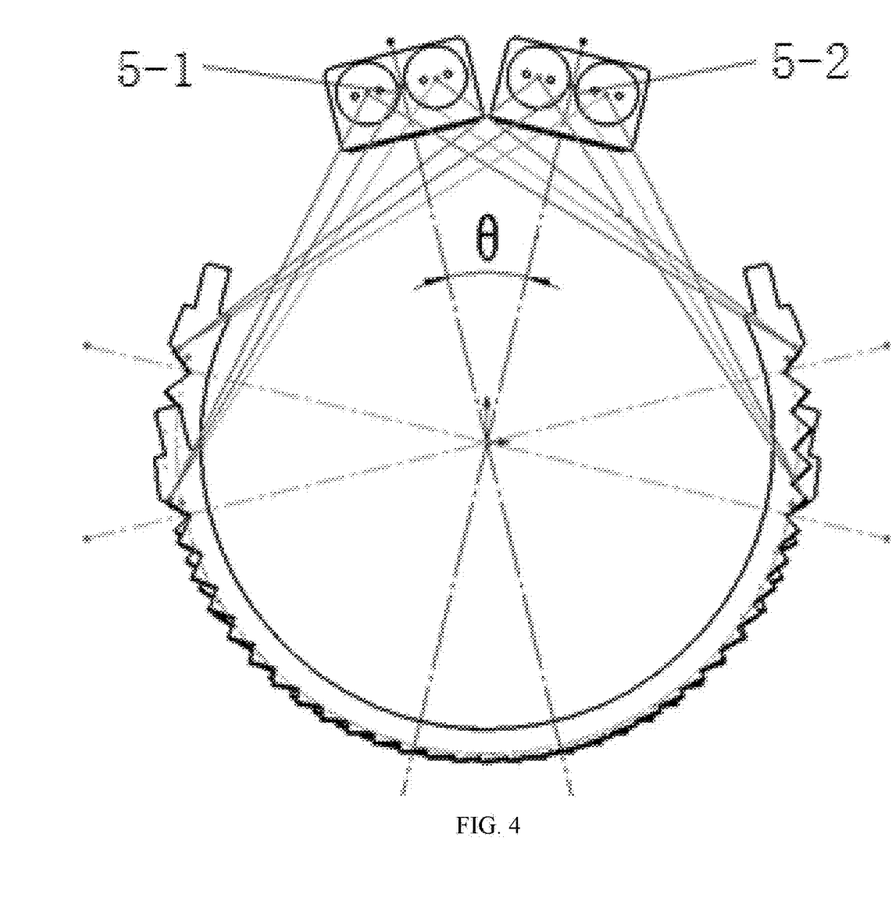
FIG. 4 is a schematic optical path diagram of adjacent single-stage image chain units in the static security CT system provided by the present invention.

As shown in FIG. 4, in order to realize the requirement for multiple scanning view angles of different baggage or parcels, the single-stage image chain units in each group of the N-stage image chain structures 5 are sequentially arranged in an advancing direction of a baggage passage, and adjacent single-stage image chain units may be arranged in a staggered manner at the same or different angles. That is, adjacent single-stage image chain units need to be staggered by a certain angle θ (e.g., the single-stage image chain unit 5-1 and the single-stage image chain unit 5-2 are staggered by the angle θ). For example, in each group of the N-stage image chain structures 5, the first single-stage image chain unit is arranged at a 0-degree position, the second single-stage image chain unit is staggered by the angle θ in a circumferential direction relative to the first single-stage image chain unit, the third single-stage image chain unit is staggered by the angle θ in the circumferential direction relative to the second single-stage image chain unit, and so on. The staggered angle θ between adjacent single-stage image chain units and the selection of the number of the single-stage image chain units of each group of the N-stage image chain structures need to be adjusted according to actual imaging requirements. For example, the staggered angle θ between adjacent single-stage image chain units and the number of the single-stage image chain units in each group of the N-stage image chain structures are adjusted according to a projection range of rotation around an object (angle of rotation around the object) formed at an angle by each of the single-stage image chain units of each group of the N-stage image chain structures 5.

In the same way, in order to meet the requirement for multi-angle imaging of different baggage or parcels, all groups of the N-stage image chain structures 5 are sequentially arranged in the advancing direction of the baggage passage. Moreover, adjacent groups of the N-stage image chain structures 5 can be arranged in a staggered manner by the same or different angles, that is, adjacent groups of the N-stage image chain structures 5 need to be staggered by a certain angle. The staggered angle between adjacent groups of the N-stage image chain structures 5 and the selection of the group number of the N-stage image chain structures need to be adjusted according to actual imaging requirements.

Figure 5:
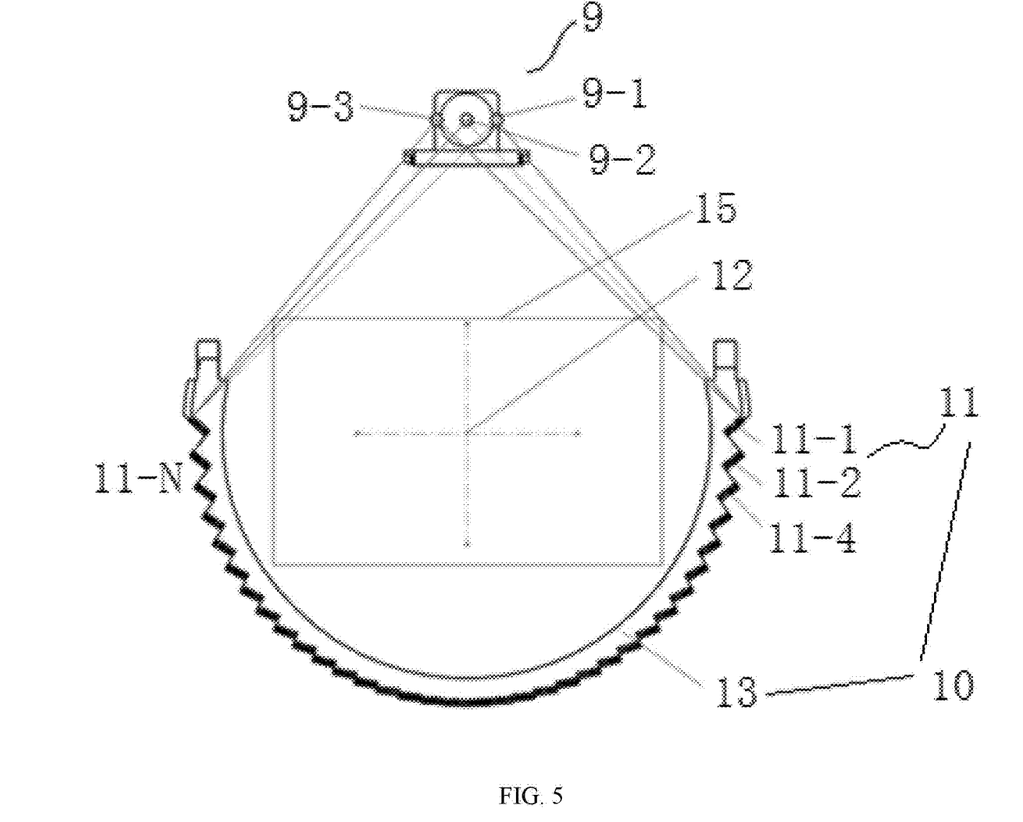
FIG. 5 is a schematic optical path diagram of a single-stage image chain unit in the static security CT system provided by the present invention.

As shown in FIG. 5, each of the single-stage image chain units includes a multi-focus X-ray source 9 and a detector assembly 10. The multi-focus X-ray source 9 can be packaged as an integral ray source from M ray tubes. M is a positive integer and preferably ranges from 2 to 24. The multi-focus X-ray source 9 can also be assembled as an assembly from a plurality of small ray sources. Among a plurality of focuses formed by the multi-focus X-ray source 9, adjacent focuses can be arranged linearly at equal intervals, and can also be arranged in an equiangular circular arc manner or a curve manner.

Specifically, since there is a virtual rotation center in an XY plane between the single-stage image chain units of each group of the N-stage image chain structures 5, the coordinates of the virtual rotation center in the XY plane are (0, 0). The coordinates of the virtual rotation center of each of the single-stage image chain units are the same, i.e., the rotation center is shared. The coordinates of the virtual rotation center in the XY plane are (0, 0), which are the coordinates of the center of a circle of an arc-shaped structure enclosed by each of the single-stage image chain units of each group of the N-stage image chain structures 5. As shown in FIG.

1 and FIG. 2, the XY plane refers to that a direction parallel to a width direction of the baggage conveying belt 4 is taken as an X axis, an upward direction perpendicular to a surface of the baggage conveying belt 4 is taken as a Y axis, and a length direction of the baggage conveying belt 4 is taken as a Z axis; and a plane formed by the X axis and the Y axis is the XY plane.

In order to ensure that an imaging field of view (FOV) of the static security CT system is large enough so that the plurality of focuses of the multi-focus X-ray source 9 of each of the single-stage image chain units can share the same detector assembly, and to ensure that when the static security CT system realizes dual-energy imaging, pixels of a dual-energy interlayer detector can be positively aligned, as described below, pixels of a low-energy detector and pixels of a high-energy detector of a high-low-energy detector are positively aligned so that imaging data of each pixel of the low-energy detector and imaging data of each pixel of the high-energy detector are in one-to-one correspondence; for the same single-stage image chain unit, among the plurality of focuses formed by the multi-focus X-ray source 9, included angles formed between connecting lines from the two focuses located on the outermost side to the virtual rotation center and a connecting line from the focus located in the middle to the virtual rotation center are not larger than 5 degrees respectively, and an included angle formed by connecting lines from the two focuses located on the outermost side to the virtual rotation center is not larger than 10 degrees.

In the plurality of focuses formed by the multi-focus X-ray source 9, positions of the ray tubes or the ray sources (small ray sources) corresponding to different focuses are different, so that the opening fan angles of ray beams corresponding to different focuses may be different and can be respectively and correspondingly represented as $\theta 1$, $\theta 2$, $\theta 3$, . . . $\theta M$. The opening fan angle of the ray beam corresponding to each focus covers an edge of the baggage passage to ensure that the X-ray beam emitted by the ray tube or the ray source (small ray source) corresponding to each of the focuses can completely cover checked baggage or parcels. Besides, in each group of the N-stage image chain structures 5, the multi-focus X-ray source 9 and the detector assembly 10 of each of the single-stage image chain units form a projection range of rotation around an object at a certain angle. In order to ensure that when the multi-focus X-ray source 9 emits a ray beam, the corresponding detector assembly receives equivalent projection data of rotation around the object, an equivalent rotation angle formed by the multi-focus X-ray source 9 and the detector assembly 10 of each of the single-stage image chain units is not smaller than 180 degrees+max ($\theta 1$, $\theta 2$, $\theta 3$, . . . , $\theta M$), so that the equivalent rotation angle formed by the multi-focus X-ray source 9 and the detector assembly meets a half-scanning data range. Max ($\theta 1$, $\theta 2$, $\theta 3$, . . . , $\theta M$) is the maximum fan angle selected from the opening fan angles of ray beams corresponding to the plurality of focuses formed by the multi-focus X-ray source 9.

The static security CT system is further provided with a grid-control switch used for controlling each ray tube or ray source (small ray source) of each of the single-stage image chain units in each group of the N-stage image chain structures 5 to rapidly emit/stop emitting X-ray beams. By means of the grid-control switch, the exposure sequence and the exposure dose of different focuses (such as focuses 9-1 to 9-3) of the multi-focus X-ray source 9 can be accurately controlled according to the running speed of the baggage conveying belt 4 in the static security CT system, the number of rows of the detector assemblies in each group of the N-stage image chain structures 5 and the response time of the detector assemblies in each group of the N-stage image chain structures.

As shown in FIG. 5, the detector assembly 10 includes a circular arc detector support 13 and a plurality of detectors 11. The plurality of detectors 11 are arranged on the circular arc detector support 13 taking the center of the baggage passage as the center of a circle (the center of a circle 12), and the plurality of detectors are right opposite to the middle position of the plurality of focuses of the multi-focus X-ray source. A multi-focus X-ray scanning area formed between the plurality of detectors (detector 11-1 and detector 11-N) should be large enough to cover the entire checked baggage passage 15.

Figure 6:
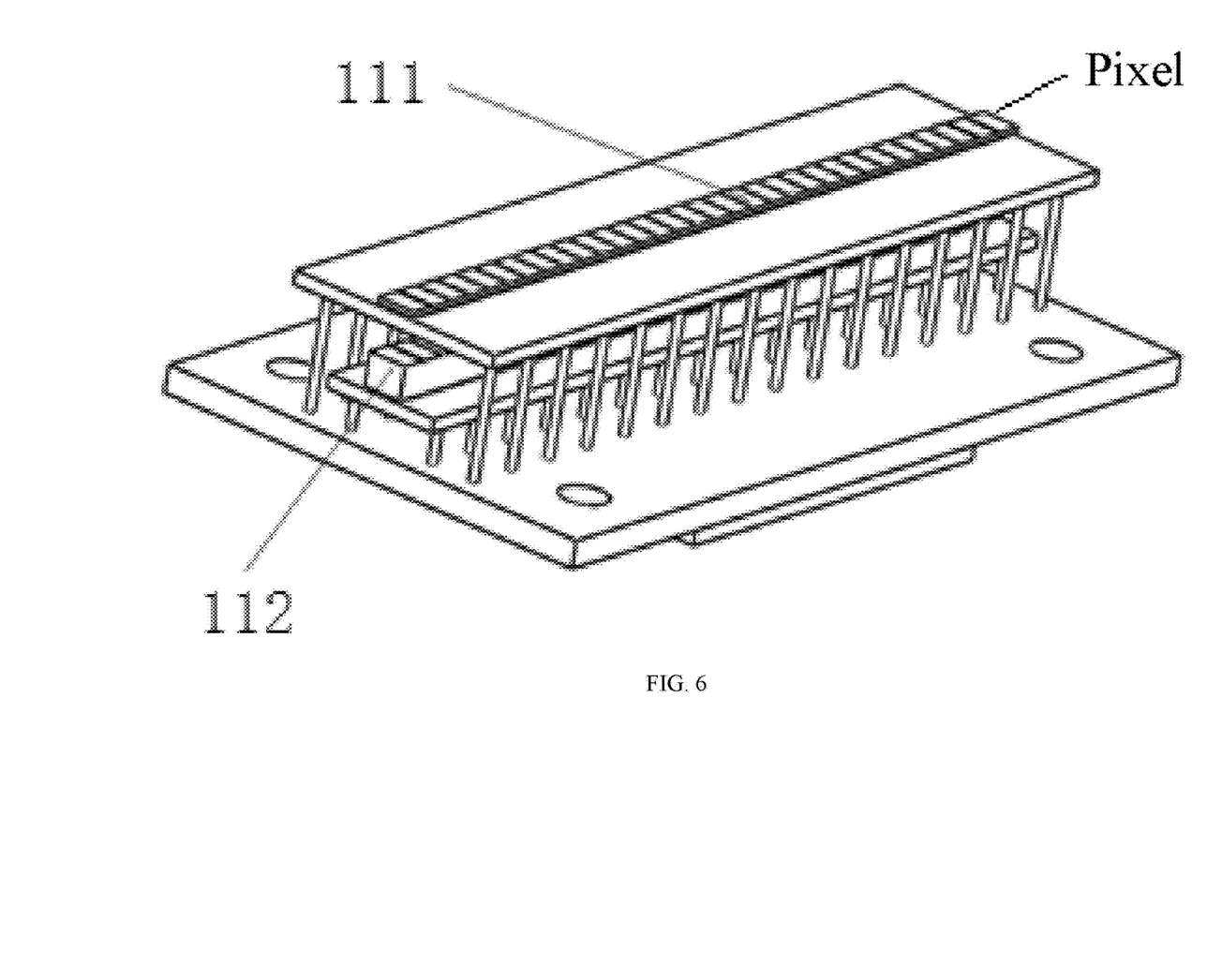
FIG. 6 is a structural diagram of single-row detectors in the static security CT system provided by the present invention.

The detectors 11 can be any one or a combination of more of single-energy detectors, dual-energy interlayer detectors and photon counting detectors. For example, assuming that the detectors are the dual-energy interlayer detectors, the dual-energy interlayer detectors are the high-low energy detectors. As shown in FIG. 6, each of the high-low energy detectors is composed of a low-energy detector 111 located on an upper layer and a high-energy detector 112 located on a lower layer. When checked baggage or parcels 3 sequentially pass through each of the single-stage image chain units of one certain group of the N-stage image chain structures through the baggage conveying belt 4 from a goods inlet, each of the single-stage image chain units will emit fan-shaped X-ray beams from the multi-focus X-ray source 9 according to a time sequence, and the high-low energy detectors of the detector assembly 10 corresponding to each of the single-stage image chain units will receive X-ray beams attenuated by goods. The X-ray beams contain low-energy X spectra and high-energy X spectra, and the low-energy detectors and the high-energy detectors in the detector assembly 10 respectively receive corresponding X-ray signal data and transmit the data to a background computer. Each checked baggage or parcel can obtain data collected from the N-stage image chain structures, and the data is processed through a preset algorithm to generate a three-dimensional cross-sectional image of the baggage or parcel.

Figure 7:
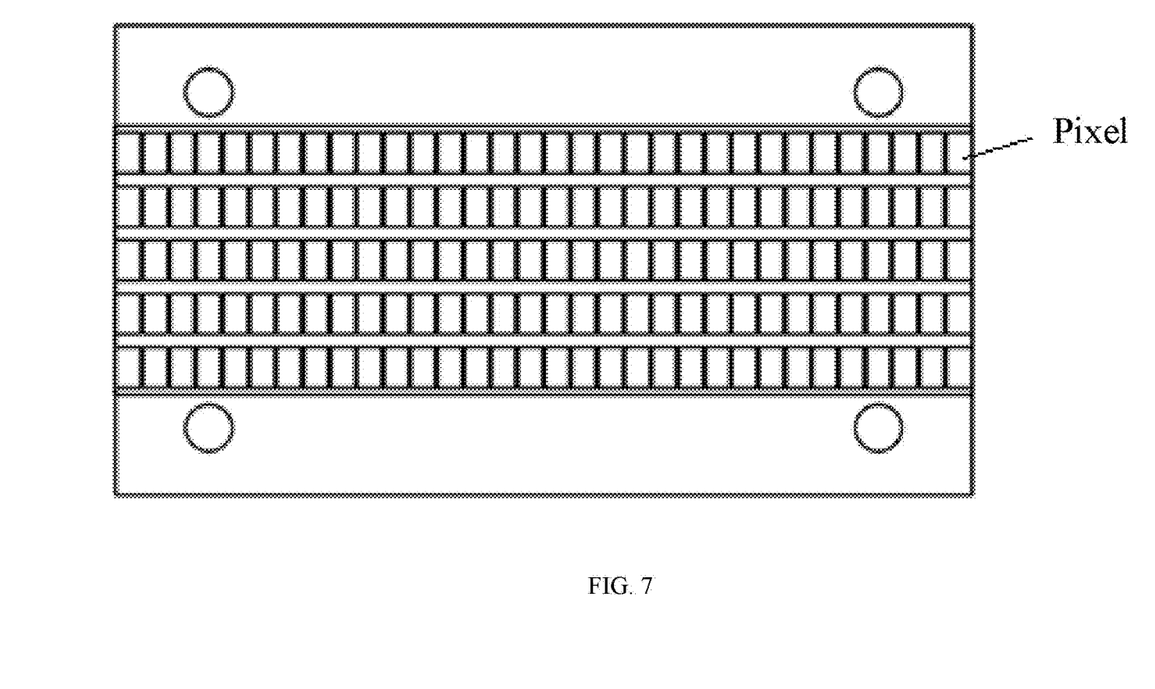
FIG. 7 is a structural diagram of multi-row detectors in the static security CT system provided by the present invention.

According to the requirement for an imaging range, the detectors in the detector assembly 10 can be single-row or multi-row detectors. As shown in FIG. 6, when the imaging range is small, the single-row detectors can be selected. In this case, the single-row detectors and the focuses of the multi-focus X-ray source share the XY plane, and the single-row detectors are right opposite to the middle position of the plurality of focuses of the multi-focus X-ray source. As shown in FIG. 7, when the imaging range is large, the multi-row detectors can be selected. In this case, the middle-row detectors in the multi-row detectors and the plurality of focuses of the multi-focus X-ray source share the same XY plane, and the multi-row detectors are right opposite to the middle position of the plurality of focuses of the multi-focus X-ray source.

As shown in FIG. 2, the static security CT system further includes a high-voltage generator 6 used for providing a high voltage for each of the multi-focus X-ray sources. When the single-energy detectors are used as the detectors in the detector assembly 10, because working voltages of each multi-focus X-ray source can be different, the high voltage emitted by the high voltage generator 6 is controlled to enable each multi-focus X-ray source to be at different working voltages, and the static security CT system can complete dual-energy imaging or three-energy imaging or multi-energy imaging. Besides, the dual-energy interlayer detectors can also be used as the detectors to realize the dual-energy imaging of the static security CT system. For example, the high-energy detector and the low-energy detector use the same voltage value to realize the dual-energy imaging of the static security CT system. Or the detector assembly uses the photon counting detectors to realize the multi-energy imaging of the static security CT system.

The foregoing specifically describes the structure of the static security CT system provided by the present invention, and the following explains the imaging method used by the static security CT system provided by the present invention in detail.

Figure 8:
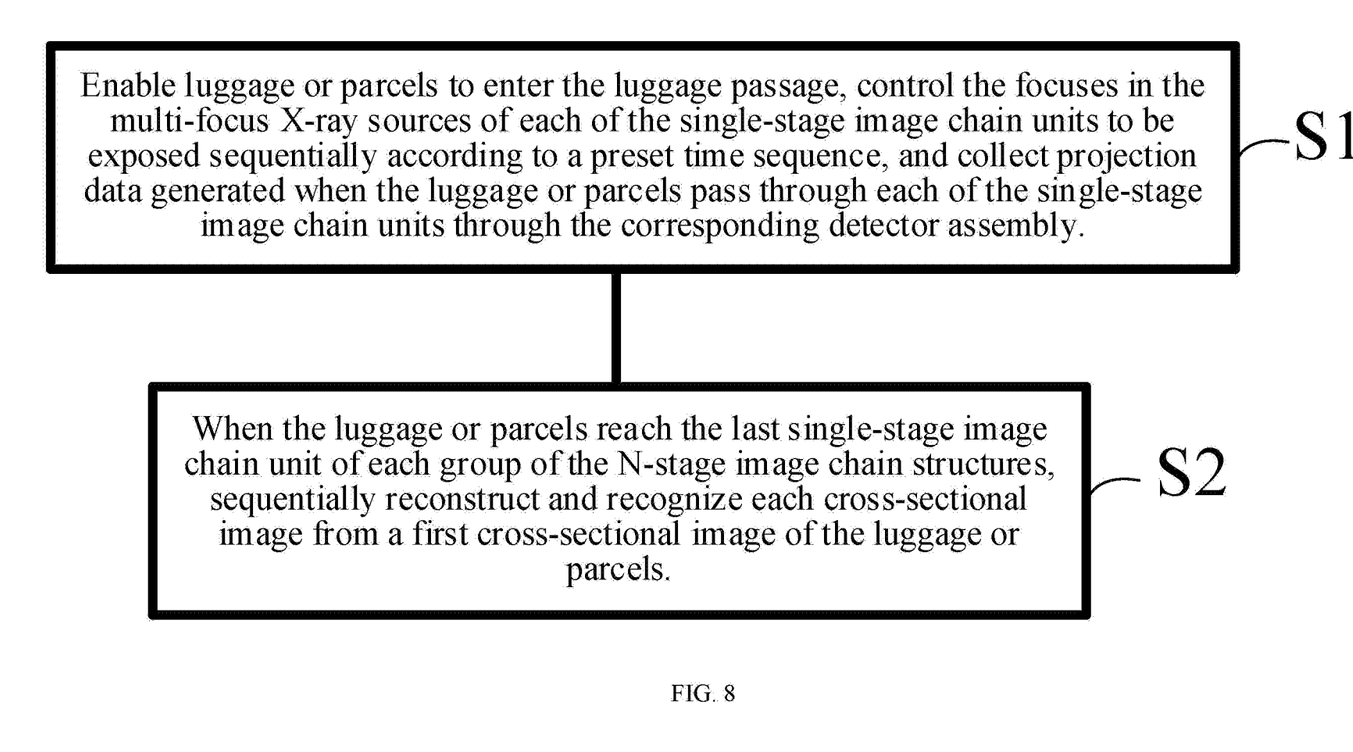
FIG. 8 is a flow diagram of an imaging method of the static security CT system provided by the present invention.

As shown in FIG. 8, the imaging method used by the static security CT system provided by the present invention includes the following steps:

Step S1: baggage or parcels are enabled to enter a baggage passage, focuses in a multi-focus X-ray source of each of single-stage image chain units are controlled to be exposed sequentially according to a preset time sequence, and projection data generated when the baggage or parcels pass through each of the single-stage image chain units is collected through a corresponding detector assembly.

When the baggage or parcels sequentially pass through each of the single-stage image chain units of one certain group of N-stage image chain structures through a baggage conveying belt 4 from a goods inlet, the exposure sequence and the exposure dose of the focuses in the multi-focus X-ray source of each of the single-stage image chain units in each group of the N-stage image chain structures 5 are controlled by means of a grid-control switch according to the running speed of the baggage conveying belt 4 of the static security CT system, the number of rows of the detector assemblies in each group of the N-stage image chain structures 5 and the response time of the detector assemblies in each group of the N-stage image chain structures.

Due to the fact that only one ray tube or ray source of the multi-focus X-ray source of each of the single-stage image chain units can emit ray beams at a time, one ray tube or ray source in the multi-focus X-ray source of each of the single-stage image chain units can be controlled at a time to simultaneously emit ray beams through the grid-control switch according to the exposure sequence of the focuses in the multi-focus X-ray source of each of the single-stage image chain units. In this way, the focuses in the multi-focus X-ray source of each of the single-stage image chain units can be controlled to be sequentially exposed through the grid-control switch. The focuses in the multi-focus X-ray source of each of the single-stage image chain units are exposed and then projected onto the corresponding detector assembly, and accordingly projection data of the baggage or parcels passing through each of the single-stage image chain units is collected through the corresponding detector assembly. The projection data collected by the detector assembly of each of the single-stage image chain units is transmitted to a background computer.

Step S2: when the baggage or parcels reach the last single-stage image chain unit of each group of the N-stage image chain structures, each cross-sectional image is sequentially reconstructed and recognized from a first cross-sectional image of the baggage or parcels.

Since a three-dimensional cross-sectional image of the baggage or parcels is composed of a plurality of cross-sectional images, and in the three-dimensional cross-sectional image of each baggage or parcel, each cross-sectional image is a cross-sectional image corresponding to a cross-sectional position formed in a manner that the corresponding cross-sectional position of the baggage or parcel sequentially passes through all the single-stage image chain units of the current group of the N-stage image chain structures, and then projection data of the cross-sectional position collected by each of the single-stage image chain units is reconstructed.

When the baggage or parcels reach the last single-stage image chain unit of each group of the N-stage image chain structures, each of the single-stage image chain units of the current group of the N-stage image chain structures has completed the collection of projection data of a cross-sectional position at a head of the baggage or parcels, so that the reconstruction of a first cross-sectional image corresponding to the cross-sectional position at the head of the baggage or parcels can be realized according to the collected projection data. The reconstructed first cross-sectional image is recognized according to an attenuation coefficient, an electron density and an equivalent atomic number of the first cross-sectional image by a computer pre-installed recognition program (such as an image recognition program commonly used in existing security inspection equipment) so as to determine whether there is prohibited goods in the cross-sectional image. Along with the traveling of the baggage or parcels, a plurality of cross-sectional positions of the baggage or parcels sequentially pass through the last single-stage image chain unit of each group of the N-stage image chain structures, and at this time, other cross-sectional images of the baggage or parcels are sequentially reconstructed and recognized by using the reconstruction and recognition method for the first cross-sectional image.

It should be emphasized that the background computer can reconstruct each cross-sectional image of the baggage or parcels by using an analytical reconstruction algorithm or an iterative reconstruction algorithm. The background computer may also reconstruct each cross-sectional image of the baggage or parcels by using an analytical and iterative hybrid reconstruction algorithm. When a product of the number of the single-stage image chain units of each group of the N-stage image chain structures and the number of the focuses of the multi-focus ray source of each of the single-stage image chain units is large, if the product is larger than 720, the analytical reconstruction algorithm is preferably used to reconstruct each cross-sectional image of the baggage or parcels. For an implementation process of the analytical reconstruction algorithm, please refer to the paper *Optimized Iterative Method for Projection Decomposition of X-Ray Dual-Energy Computed Tomography* by Li Baolei et al. (published in Journal of Optics, 2017, 10: 365-374), and the paper *A three-dimensional-weighted cone beam filtered backprojection (CB-FBP) algorithm for image reconstruction in volumetric CT-helical scanning* by Xiangyang Tang et al. (published in Phys Med Bio, 51 (2006) 855-874).

When the product of the number of the single-stage image chain units of each group of the N-stage image chain structures and the number of the focuses of the multi-focus ray source of each of the single-stage image chain units is small, if the product is smaller than 360, the iterative reconstruction algorithm is preferably used to reconstruct each cross-sectional image of the baggage or parcels. For an implementation process of the iterative reconstruction algorithm, please refer to the paper *Model-Based Iterative Reconstruction for Dual-Energy X-Ray CT Using a Joint Quadratic Likelihood Model* by Ruoqiao Zhang et al. (published in IEEE Transactions on Medical Imaging, 2014, 33:117-134).

When the product of the number of the single-stage image chain units of each group of the N-stage image chain structures and the number of the focuses of the multi-focus ray source of each of the single-stage image chain units is between 360 and 720, the analytical and iterative hybrid reconstruction algorithm is preferably used to reconstruct each cross-sectional image of the baggage or parcel. For an implementation process of the analytical and iterative hybrid reconstruction algorithm, please refer to the paper *Accurate iterative FBP reconstruction method for material decomposition of dual energy CT* by Mengfei Li et al. (published in IEEE Transactions on Medical Imaging, 2018).

After the baggage or parcels leave the last single-stage image chain unit of each group of the N-stage image chain structures, collection of the projection data of the baggage or parcels by the current group of the N-stage image chain structures is completed, remaining cross-sectional images that are not reconstructed and recognized in the current baggage or parcels continue to be reconstructed and recognized in sequence by the method in the step S2.

After reconstruction and recognition of each of the cross-sectional image of the whole baggage or parcel are completed, if it is recognized that there is prohibited goods in the baggage or parcels possibly, alarm information is given so as to facilitate subsequent unpacking inspection work by security staff.

According to the static security CT system provided by the present invention, the plurality of single-stage image chain units composed of the multi-focus X-ray sources and the detector assemblies are used to form the N-stage image chain structures. Through exposure of different sequential ray sources in the N-stage image chain structures, images with higher time resolution and more energy levels than a spiral CT system can be generated, and the recognition rate of prohibited goods and the baggage inspection speed are improved. On the other hand, the static security CT system gets rid of the dependence on a slip ring, the multi-focus X-ray sources and the detectors do not need to rotate, and non-rotation static imaging is realized, so that the maintenance cost is reduced, and the equipment stability is improved.

The foregoing describes the multi-energy static security CT system and the imaging method provided by the present invention in detail. For those of ordinary skill in the art, any obvious change made to the present invention without departing from the essence of the present invention shall fall within the protection scope of the patent right of the present invention.

What is claimed is:

1. A multi-energy static security CT system, comprising at least one group of N-stage image chain structures, wherein an inner side of bottoms of the N-stage image chain structures being provided with a baggage conveying belt, and the N-stage image chain structures and the baggage conveying belt being fixed at preset positions through a machine frame, wherein N is a positive integer;

all groups of the N-stage image chain structures are sequentially arranged in an advancing direction of a baggage passage, and adjacent groups of the N-stage image chain structures are arranged in a staggered manner, each group of the N-stage image chain structures is composed of N single-stage image chain units;

each of the single-stage image chain units comprises a multi-focus X-ray source and a detector assembly; among the plurality of focuses formed by the multi-focus X-ray source, an opening fan angle of a ray beam corresponding to each of the focuses covers edges of the baggage passage; and moreover, an equivalent rotation angle which is a projection range of rotation around an object at a certain angle formed by the multi-focus X-ray source and the detector assembly of each of the single-stage image chain units is not smaller than 180 degrees+max ($\theta1, \theta2, \theta3, \ldots, \theta M$), wherein the max ($\theta1, \theta2, \theta3, \ldots, \theta M$) is the maximum fan angle selected from the opening fan angles of ray beams corresponding to the plurality of focuses formed by the multi-focus X-ray source, M is a positive integer; and all the single-stage image chain units in each group of the N-stage image chain structures are sequentially arranged in the advancing direction of the baggage passage, and adjacent single-stage image chain units are arranged in a staggered manner at the same or different angles in a circumferential direction.

2. The multi-energy static security CT system of claim 1, wherein
among a plurality of focuses formed by the multi-focus X-ray source, adjacent focuses are arranged in a manner of any one of equidistant straight-line arrangement, equiangular circular arc arrangement and equiangular curve arrangement.

3. The multi-energy static security CT system of claim 1, wherein
for the same single-stage image chain unit, among the plurality of focuses formed by the multi-focus X-ray source, included angles formed between connecting lines from two focuses located on the outermost side to a virtual rotation center and a connecting line from a focus located in the middle to the virtual rotation center are not larger than 5 degrees respectively, and an included angle formed by connecting lines from the two focuses located on the outermost side to the virtual rotation center is not larger than 10 degrees.

4. The multi-energy static security CT system of claim 1, wherein
a grid-control switch for controlling emitting/emitting stop of a ray tube or a ray source of each of the single-stage image chain units is disposed in the multi-energy static security CT system;
the grid-control switch is used for controlling exposure sequence and exposure dose of different focuses of the multi-focus X-ray source according to running speed of the baggage conveying belt, number of rows of the detector assemblies in each group of the N-stage image chain structures, and response time of detector assemblies in each group of the N-stage image chain structures.

5. The multi-energy static security CT system of claim 1, wherein
the detector assembly comprises a circular arc detector support and a plurality of detectors, the plurality of detectors is arranged on the circular arc detector support taking the center of the baggage passage as the center of a circle, and the plurality of detectors are right opposite to the middle position of the plurality of focuses of the multi-focus X-ray source.

6. The multi-energy static security CT system of claim 5, wherein
the detectors are any one or a combination of more of single-energy detectors, dual-energy interlayer detectors and photon counting detectors.

7. The multi-energy static security CT system of claim 6, wherein
when the detectors are single-row detectors, the single-row detectors and the focuses of the multi-focus X-ray source share an XY plane, and the single-row detectors are right opposite to the middle position of the plurality of focuses of the multi-focus X-ray source; and when the detectors are multi-row detectors, the middle-row detectors in the multi-row detectors and the plurality of focuses of the multi-focus X-ray source share an XY plane, and the multi-row detectors are right opposite to the middle position of the plurality of focuses of the multi-focus X-ray source.

8. An imaging method, implemented by the multi-energy static security CT system of claim 1, and comprising the following steps:

enabling baggage or parcels to enter a baggage passage, controlling focuses of a multi-focus X-ray source of each of single-stage image chain units to be exposed sequentially according to a preset time sequence, and collecting projection data generated when the baggage or parcels pass through each of the single-stage image chain units through a corresponding detector assembly; and when the baggage or parcels reach the last single-stage image chain unit of each group of N-stage image chain structures, sequentially reconstructing and recognizing each cross-sectional image from a first cross-sectional image of the baggage or parcels.

* * * * *